April 26, 1927.
R. C. McARTHUR
1,625,818
TURNBUCKLE
Filed Nov. 11, 1925
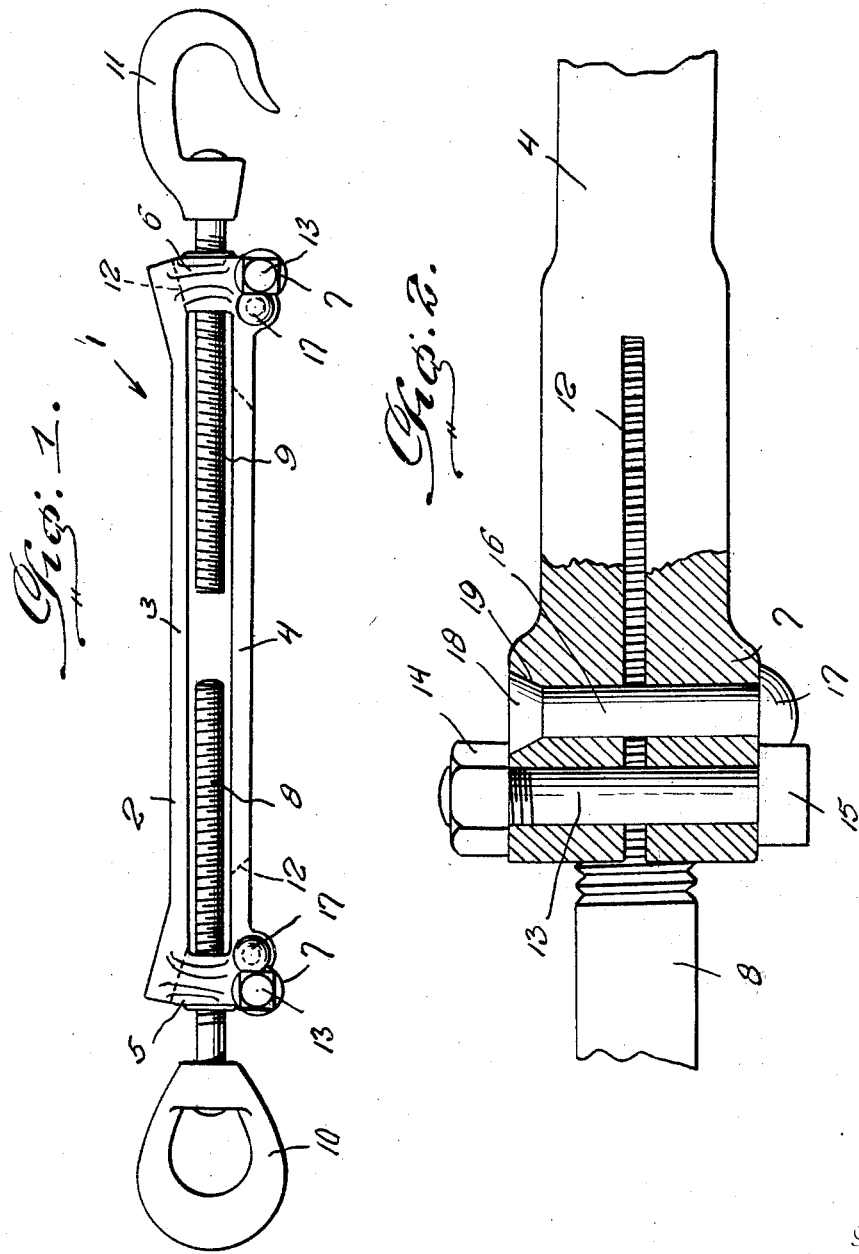
Inventor
R. C. McArthur,
By Clarence A. O'Brien
Attorney Patented Apr. 26, 1927.

1,625,818

UNITED STATES PATENT OFFICE.

ROBERT C. McARTHUR, OF SALAMANCA, NEW YORK, ASSIGNOR TO WALTER O. FREDRIKSON, A. EDWARD KRIEGER AND ROBERT C. McARTHUR, TRUSTEES, OF SALAMANCA, NEW YORK, CONSTITUTING McARTHUR TURNBUCKLE COMPANY.

TURNBUCKLE.

Application filed November 11, 1925. Serial No. 68,432.

This invention relates to improvements in turnbuckles and has for its principal object to provide means for preventing the accidental displacement or loosening of the rods of the turnbuckles from the yoke or frame when the turnbuckle is in use.

When turnbuckles are used on oil pump pull rods, drill rigs, derricks, guy ropes and the like, there is considerable vibration, and as a result the oppositely threaded rods of the turnbuckles will become loose and cause a slack to occur, which as a result renders the turnbuckle inefficient for the purpose for which it is designed.

For the purpose of overcoming the above disadvantages and to insure the locking of the opposed threaded rods in their properly adjusted position so that there will be no possibility of the rods working loose and causing a slack to occur, I have provided a highly novel, yet simple means for compressing the threaded end portions of the yoke of the turnbuckle through which the rods extend.

A further object is to provide a turnbuckle which is of such construction as to obviate the necessity of having to provide lock nuts for securing the threaded rods in their properly adjusted positions, which lock nuts ordinarily cause distortion of the threads of the rods when strain is placed upon the turnbuckle.

A further object is to provide a turnbuckle of the above mentioned character, which is simple in construction, inexpensive, strong and durable, and further well adapted to the purpose for which it is designed.

Other objects and advantages of the invention will become apparent during the course of the following description taken in connection with the accompanying drawing.

In the accompanying drawing forming part of this application, and in which like numerals designate like parts throughout the same:

Figure 1 is a side elevation of the turnbuckle embodying my invention, and

Figure 2 is an enlarged fragmentary detail, partly in section, and partly in elevation of one of the split end portions of the yoke or frame showing the tightening bolt and the safety rivets associated therewith.

In the drawing, wherein for the purpose of illustration is shown the preferred embodiment of my invention, the numeral 1 designates generally my improved turnbuckle, the same comprising a yoke or frame member 2 which includes the elongated parallel spaced arms 3 and 4 respectively, and the thickened end portions 5 and 6, respectively.

As is more clearly illustrated in Figure 1, the ends of the arm 3 are slightly flared outwardly, while the ends of the other arm 4 are provided with the enlargement 7, the purpose of which will be hereinafter more fully described.

The yoke or frame member 2 is preferably an integral casting. The end members 5 and 6 are provided with aligned threaded bores for receiving the oppositely threaded rods 8 and 9 respectively. It is of course to be understood that the bore of the end member 5 will have its threads disposed in one direction, while the threads of the bore in the other end member 6 will be disposed in an opposite direction for accommodating the left and right hand threads of the rods 8 and 9 respectively, in the manner well known in the art. The outer ends of the threaded rods carry thereon the usual engaging elements 10 and 11, respectively, in the manner also well known in the art. As the same forms no important part of the present invention, a further description thereof is thought unnecessary.

Ordinarily lock or jam nuts are threaded on the threaded rods of a turnbuckle and engage the respective end members of the yoke for holding the rods in their proper adjusted positions. However, due to the considerable vibrations to which the turnbuckle is subjected, when in use, there is a tendency of the threaded rods to work loose, and as a result the lock or jam nuts will distort the threads of the rod, and thereby render the rod of little or no further use. Furthermore, these lock or jam nuts as are ordinarily employed will not effectively hold the threaded rods of the turnbuckle from working loose and causing slack to take place. For the purpose of overcoming the above disadvantages and to further effectively and rigidly secure the threaded rods of the turnbuckles in their proper adjusted positions without any danger of the threads of the rods becoming distorted, I have provided a highly novel and simple means, the construction of which will be presently apparent.

Each end of the arm 4 is slit longitudinally as illustrated at 12, and the slot extends through the threaded bores of the respective end members in the manner shown in the dotted lines, more clearly in Figure 1. A tightening bolt 13 extends transversely through the enlarged portion 7 at each end of the arm 4 in the outermost lower portion of the enlargement. A nut 14 is threaded on the threaded end of each tightening bolt 13, and as is more clearly illustrated in Figure 2, the head of the bolt indicated at 15 engages one side face of the enlarged portion at each end of the arm 4, the nut 14 being adapted to engage the opposite side face. Manifestly, by turning the nut 14 in one direction, the split end of the arm 4 will be tightening, and at the same time the threaded bores of the respective end members will also be clamped around the respective threaded rods for effectively and rigidly securing the latter in their proper adjusted positions.

There is a possibility sometimes of the tightening bolts 13 breaking or the threads thereof becoming stripped and for the purpose of preventing the casual displacement of the threaded rods from the ends of the yoke or frame should this happen, there is provided what I term as safety rivets in connection with the split portions of the respective ends of the arm 4. The safety rivet is indicated at 16 and as clearly illustrated in Figure 2, the same extends transversely through the enlarged portion 7 at each end of the arm at a point inwardly and slightly above the respective tightening bolt 13, the head 17 of each rivet engaging one side face of the enlargement 7, while the upset end 18 is adapted to be disposed within a countersunk opening 19 provided therefor in the opposite side face of the enlargement. These safety rivets will limit the expansion of the split portions of the ends of the arm 4 so that the threaded rod will not become disengaged from their respective threaded bores in the end members of the yoke.

It is obvious that by loosening the nut 14, the compression on the split ends of the arm 4 is reduced to permit the rods 8 and 9 to be moved either inwardly or outwardly and after the proper adjustment has been made, the nuts are again tightened, thus causing the split ends of the arm 4 to be drawn together. It is of course understood that when the rods are being adjusted, the end portions of the arm 3 which are solid will take the load or pressure and when the proper adjustment is made, and the split ends of the arm 4 are compressed, the load or pressure will be divided between the ends of the arm.

The provision of a turnbuckle of the above mentioned character will compensate for any vibration to which the turnbuckle is subjected when in use, and furthermore will insure the holding of the oppositely threaded rods in their proper adjusted positions so that there will be no possibility of any slack taking place.

While I have shown the preferred embodiment of my invention, it is to be understood that minor changes in the size, shape and arrangement of parts may be resorted to without departing from the spirit or scope of the invention.

Having thus described the invention, what I claim as new is:—

1. A turnbuckle comprising a yoke, the ends thereof being provided with threaded bores, the yoke being split longitudinally at each end portion, the slits extending through the respective threaded bores, a pair of oppositely threaded rods receivable in the respective bores, and a tightening bolt extending transversely through each of the slit portions of the yoke, and means for limiting the lateral expansion of the split portions of the yoke should the tightening bolt become disengaged from the split portion of the yoke.

2. A turnbuckle comprising a yoke, the ends thereof being provided with threaded bores, the yoke being split longitudinally at each end portion, the slits extending through the respective threaded bores, a pair of oppositely threaded rods receivable in the respective bores, and a tightening bolt extending transversely through each of the slit portions of the yoke, and means for limiting the lateral expansion of the split portions of the yoke should the tightening bolt become disengaged from the split portion of the yoke, said means comprising rivets extending transversely through the slit portions of the yoke.

3. A turnbuckle comprising a yoke including parallel spaced arms and end members bridging the ends of the arms, each of said end members being provided with a threaded bore, one of said arms being slit longitudinally at each end thereof, the slits extending into the respective threaded bores of the end members, a pair of oppositely threaded rods receivable in the respective bores, and a tightening bolt extending transversely through the slit portions of each of the ends of said arm for securing the rods in their adjusted positions, and a safety rivet extending transversely through the split portions of each end of said arm and arranged inwardly of the respective tightening bolts for limiting the lateral expansion of the split portions of the arm when the tightening bolts are rendered inoperative.

4. A yoke including parallel spaced arms and end members bridging the ends of the arms, each of said end members being provided with the threaded bore, a pair of oppositely threaded rods receivable in the bores, one of said arms being provided with an enlargement at each end thereof, each of said enlargements being split longitudinally, the slits extending into communication with the respective threaded bores, a tightening bolt extending transversely through the split portions of each enlargement adjacent the outer end thereof for securing the threaded rods in their adjusted positions with respect to the bores.

5. A yoke including parallel spaced arms and end members bridging the ends of the arms, each of said end members being provided with the threaded bore, a pair of oppositely threaded rods receivable in the bores, one of said arms being provided with an enlargement at each end thereof, each of said enlargements being split longitudinally, the slits extending into communication with the respective threaded bores, a tightening bolt extending transversely through the split portions of each enlargement adjacent the outer end thereof for securing the threaded rods in their adjusted positions with respect to the bores, and a safety rivet disposed transversely through the split portions of each enlargement at a point inwardly from the respective tightening bolts.

In testimony whereof I affix my signature.

ROBERT C. McARTHUR.